US007031576B2

(12) United States Patent
Deane

(10) Patent No.: US 7,031,576 B2
(45) Date of Patent: Apr. 18, 2006

(54) CONNECTORIZED SILICON BENCH FOR PASSIVELY ALIGNING OPTICAL FIBERS

(75) Inventor: Peter Deane, Moss Beach, CA (US)

(73) Assignee: National Semiconductor Corporation, Santa Clara, CA (US)

( * ) Notice: Subject to any disclaimer, the term of this patent is extended or adjusted under 35 U.S.C. 154(b) by 165 days.

(21) Appl. No.: 10/627,437

(22) Filed: Jul. 25, 2003

(65) Prior Publication Data

US 2005/0018969 A1   Jan. 27, 2005

(51) Int. Cl.
*G02B 6/30* (2006.01)
(52) U.S. Cl. .......................................... 385/49; 385/88
(58) Field of Classification Search .................. 385/49, 385/88, 89, 91–94
See application file for complete search history.

(56) References Cited

U.S. PATENT DOCUMENTS 5,757,999 A * 5/1998 Tabuchi et al. ............... 385/93
5,764,836 A * 6/1998 Roff ............................. 385/88
5,960,141 A * 9/1999 Sasaki et al. ................. 385/88
6,293,711 B1 * 9/2001 Sasaki ........................... 385/88
6,550,981 B1 * 4/2003 Yamauchi ..................... 385/88
6,599,029 B1 * 7/2003 Yamazaki et al. ............ 385/80
6,926,450 B1 * 8/2005 Hung ............................ 385/84

* cited by examiner

*Primary Examiner*—Sung Pak
(74) *Attorney, Agent, or Firm*—Beyer Weaver & Thomas, LLP

(57) ABSTRACT

A connectorized silicon bench and ferrule that aids in the passive alignment of optical fibers to optical components on the bench. The apparatus includes a bench having an optical component, a groove formed in the bench, the groove configured to accommodate an optical fiber; and a ferrule, including a recess region to accommodate the optic fiber when the ferrule is mounted onto the bench. The groove and the ferrule cooperate to passively align the optical fiber and the optical component on the bench. A connector sleeve, which accommodates the silicon bench and ferrule, includes a receptacle that is configured to receive a plug-in connector which optically couples the optical fiber to an optical network or link.

14 Claims, 3 Drawing Sheets

CONNECTORIZED SILICON BENCH FOR PASSIVELY ALIGNING OPTICAL FIBERS

BACKGROUND OF THE INVENTION

1. Field of the Invention

The present invention relates generally to fiber optic connectors, and more particularly, to a connectorized silicon bench and stepped ferrule that aids in the passive alignment of optical fibers and optical components on the bench.

2. Description of the Related Art

With the ever increasing popularity of the Internet and other data networks, fiber optics have become more and more prevalent. Since fiber has the capability of transmitting significantly more data than copper wires or wireless networks, a significant majority of the new networking infrastructure currently being implemented is based on fiber optics.

Fiber optic networks can generally be characterized as either "long" haul or "short" haul. Long haul networks are used to transmit data over long distances, such as between major metropolitan areas, across continents or oceans. Long haul networks typically rely on single mode fibers that are capable of transmitting only a single data stream of information. These cables are typically between 125 microns in diameter and have a single fiber optic inner core of approximately 8 microns. In contrast, short haul networks can are typically "multi-mode. Multi-mode cables typically have an outer diameter of approximately 125 microns and an inner fiber optic core of approximately 50 microns.

While much of the communications infrastructure being built to day is based on fiber optics, most computing environments still operate in the electrical domain. As a consequence, data signals have to be converted from the electrical to the optical domain, and vice versa, at equipment interfaces. Individual fiber cables therefore terminate at the junction at either an optical receiver, such as a photo-detector, that converts light pulses received over the fiber into electrical signals or an optical emitter, like a laser or LED, that converted electrical signals into light pulses and transmits them down the fiber.

A connector is typically used to connect the fiber with the optical detector or emitting source (hereafter sometimes generically referred to as "optical component"). A connection is typically made by including a lens that is positioned between the optical component and the end of the fiber. During data transmission, as the light pulses exit an emitter, the light tends to diverge. The lens converges the light to focus it on the cross section of the termination point of the fiber. During data receipt, the opposite occurs. The lens focuses or converges the diverged light exiting the fiber onto the optically sensitive surface of the photo-detector.

Since data transmission takes place in the form of light pulses traveling through a thread of glass, it is important that the optical component, lens and optical fiber are all in proper alignment. Ideally, tolerances should be within a few microns. To achieve these tolerances, active alignment is needed. With active alignment, the optical component and lens are first mounted onto the substrate. The fiber is next placed on the substrate. Light is then transmitted through the fiber while a robot positions the substrate relative to the fiber. At the point where the highest intensity of light from the fiber is measured, the assembly is considered "aligned". The fiber is then locked into place on the substrate to maintain the alignment. A problem with the aforementioned package is that fiber attach results in a fiber "pigtail" which extends from the substrate. A ferrule connected to the pigtail is required to terminate the pigtail and to connect the fiber to an optical network or link. Traditional packages such as 'butterfly' packages thus require connectorization separate to the optical package itself.

Fibers can also be aligned to emitting and receiving components using a silicon optical bench which provides accurate mechanical alignment to approximately plus or minus one micron, but the assembly typically requires a package resulting in a fiber cable pigtail. A ferrule of some type is traditionally still needed to terminate the pigtail and enable connection to the main fiber link.

A ferrule that is integrated directly onto a silicon optical bench and that enables a direct optical connection interface to the silicon optical bench without the intermediate pig-tail fiber is therefore needed.

SUMMARY OF THE INVENTION

The present invention relates to a ferrulized silicon bench that aids in the connectorization of optical fiber cables to optical components on the bench. The apparatus includes a bench having an optical component, a groove formed in the bench, the groove configured to accommodate an optical fiber; and a ferrule, including a recess region to accommodate the optic fiber when the ferrule is mounted onto the bench. The groove and the ferrule cooperate to mechanically align the optical fiber and the optical component on the bench. A connector sleeve, which accommodates the silicon bench and ferrule, includes a receptacle that is configured to receive a plug-in connector which optically couples the optical fiber to an optical network or link.

BRIEF DESCRIPTION OF THE DRAWINGS

The invention may best be understood by reference to the following description taken in conjunction with the accompanying drawings in which.

DETAILED DESCRIPTION OF THE PREFERRED EMBODIMENTS

In the following description, numerous specific details are set forth to provide a thorough understanding of the present invention. It will be apparent, however, to one skilled in the art that the present invention may be practiced without some or all of these specific details. In other instances, well known process steps have not been described in detail in order to avoid unnecessarily obscuring the present invention.

Figure 1:
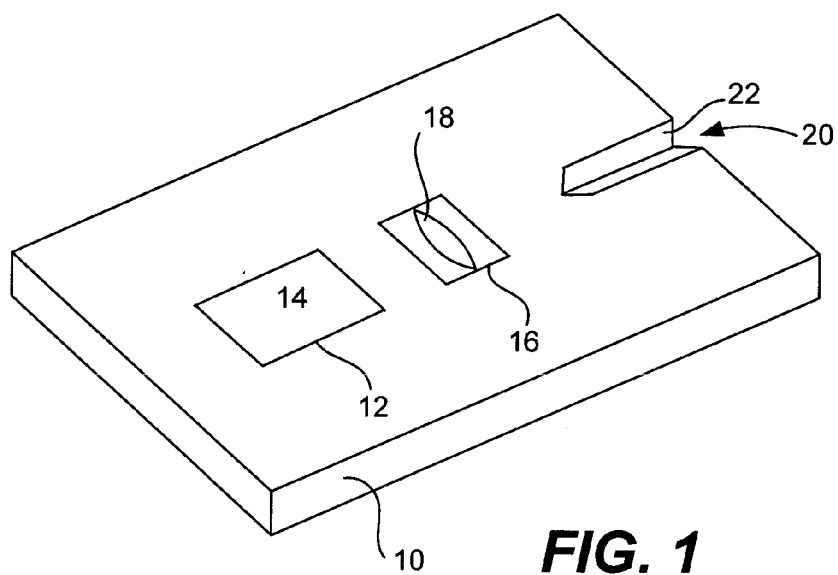
FIG. 1 is a perspective view of a silicon bench according to the present invention.

Referring to FIG. 1, a perspective view of a silicon bench according to the present invention is shown. The silicon bench 10 includes a pad 12 for mounting an optical component 14 (either an emitter, photo-detector, or both), a recess region 16 for recessing a lens or waveguide 18, and an alignment V-groove 20 with angled side walls 22. The recess region 16 and the V-groove 20 are etched into the silicon bench 10. Using well known semiconductor processing techniques, extremely high tolerance levels may be obtained, for example one micron or less.

Figure 2:
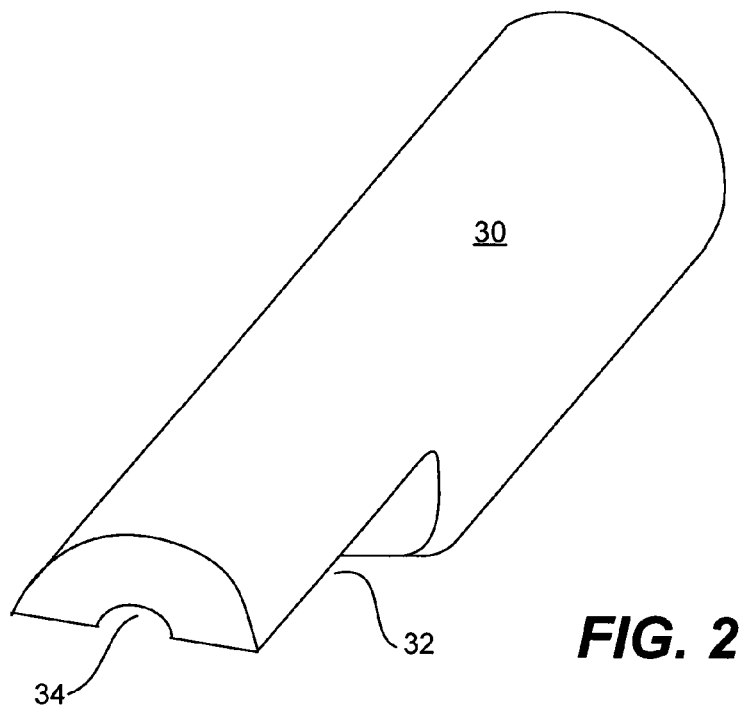
FIG. 2 is a perspective view of a stepped ferrule used with the silicon bench of the present invention.

Referring to FIG. 2, a perspective view of a stepped ferrule 30 used with the silicon bench 10 is shown. The stepped ferrule 30 is substantially cylinder in shape and includes a stepped region 32 and a recess region 34 extending the length of the ferrule 30 for receiving a fiber optic cable (not shown). In one embodiment, the ferrule 30 is made from a precision machined piece of ceramic. In other embodiments, the ferrule can be made from other materials such as plastic, metal or any other suitable material.

Figure 3:
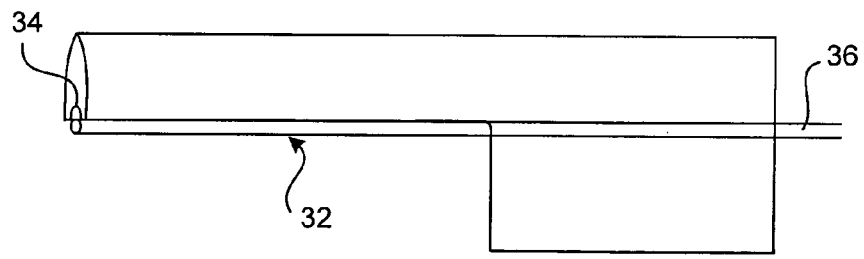
FIG. 3 is a side cross-section view of the stepped ferrule used with the silicon bench of the present invention.

Referring to FIG. 3, a side cross-section view of the stepped ferrule 30 is shown. As clearly illustrated in this figure, the recess region 34 runs the length of the ferrule and is used to accommodate a fiber optic cable 36 when inserted through the ferrule. According to various embodiments, the length of the stepped region compared to relative overall size of the ferrule 30 may vary.

Figure 4:
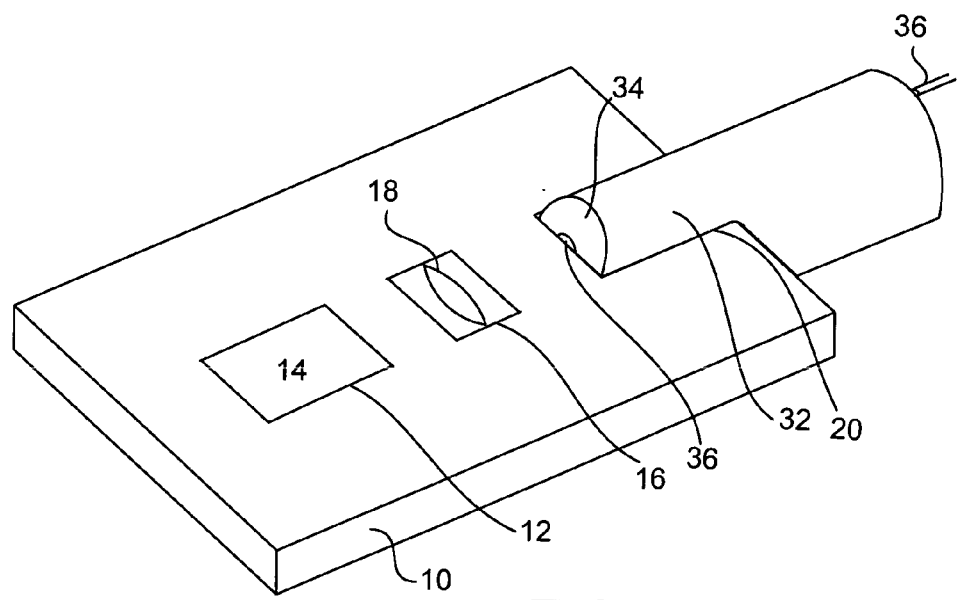
FIG. 4 is a perspective view of the stepped ferrule with the silicon bench of the present invention.

Referring FIG. 4, a perspective view of the stepped ferrule mounted onto the silicon bench 10 of the present invention is shown. As is illustrated in the figure, the fiber optic cable 36 is inserted through the recess region 34 of the ferrule 30. The ferrule 30 is then mounted onto the bench 10 such that the fiber optic cable 36 adjacent the stepped region 32 fits into the V-groove 20 of the silicon bench 10. The angled side walls 22 engage the fiber optic cable 36, causing the cable 36 to be self aligned with the lens or waveguide 18 and the optical component 14 on the silicon bench 10.

Figure 5:
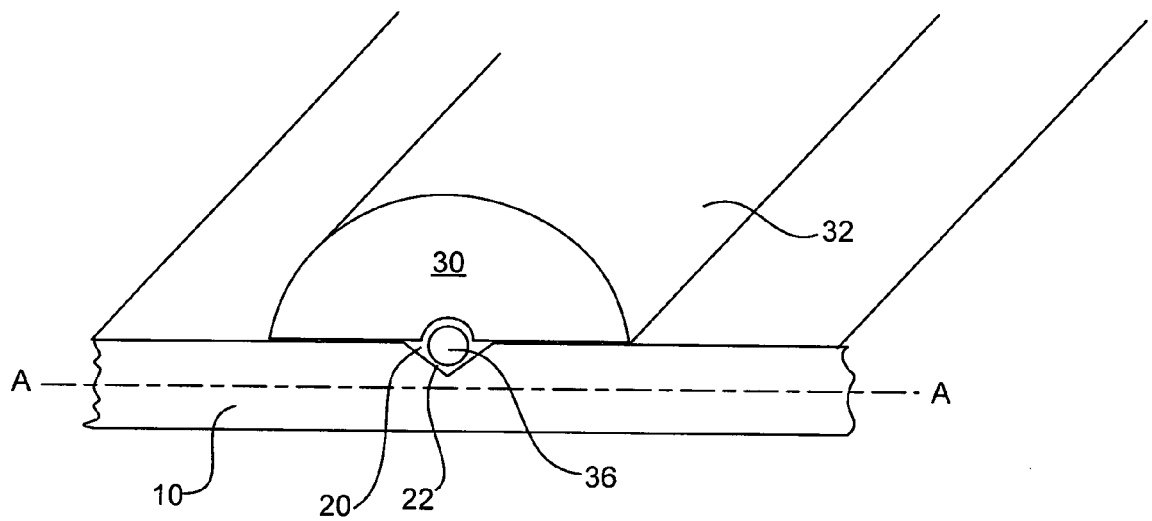
FIG. 5 is a cross section view of the stepped ferrule in passive alignment with the silicon bench.

FIG. 5 is a cross section view of the fiber optic cable 36 and the stepped ferrule 30 shown in passive alignment with the silicon bench 10. As is evident in this figure, the sloped or angled side walls 22 of the V-groove 20 aid in the passive alignment of the fiber optic cable 36 with the silicon bench 10. Specifically, the tolerances at which the side walls 22 of the V-groove 20 are formed assures that the cable 36 is aligned within a very high degree of accuracy with respect to the optical component 14 and lens 18 on the bench 10. As a result, there is no need to perform active alignment of the fiber optic cable 36 and the optical component 14 and lens or waveguide 18 using a robot or the like to position the bench 10 and the fiber optic cable 36.

Figure 6:
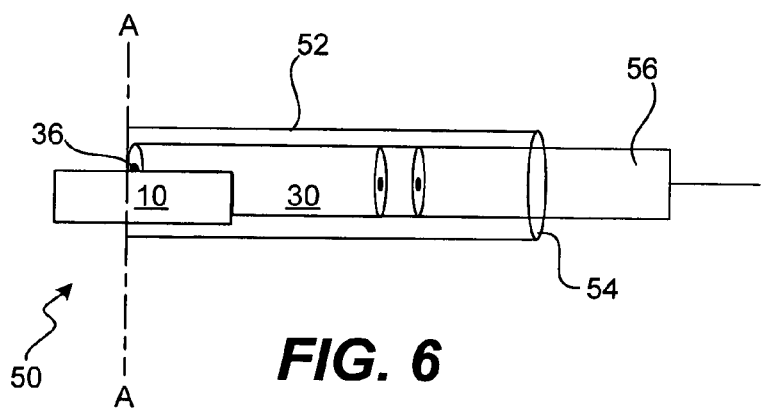
FIG. 6 is a side cross section view of a connector sleeve used to connectorize the silicon bench according to one embodiment of the present invention

Referring to FIG. 6, a side cross section view of the stepped ferrule aligned with the silicon bench and a plug in connector according to one embodiment of the present invention is shown. The connector 50 includes a sleeve 52 that fits over the silicon bench 10 and ferrule 30. The sleeve 50 includes a receptacle 54 which is configured to receive a plug-in connector 56.

Figure 7A:
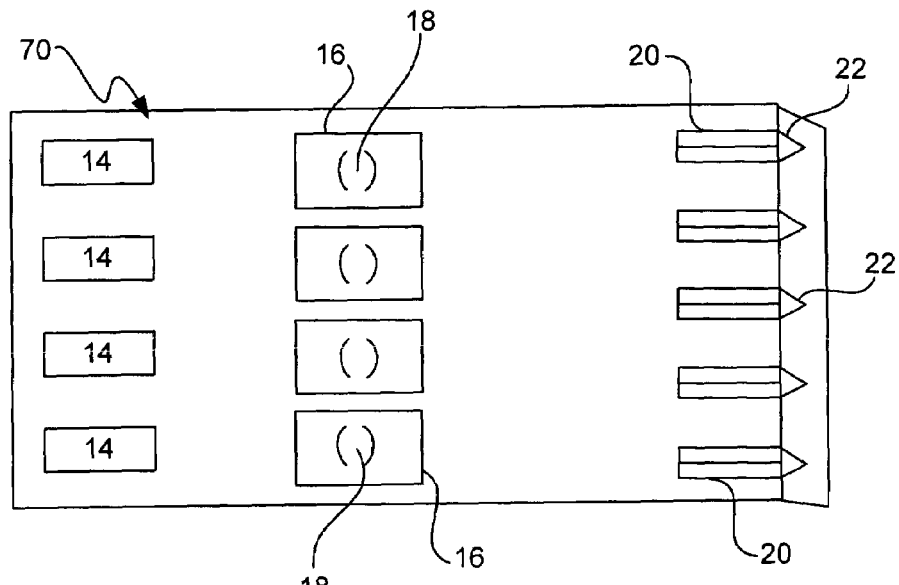
FIGS. 7A–7B illustrate another embodiment of the present invention.
Figure 7B:
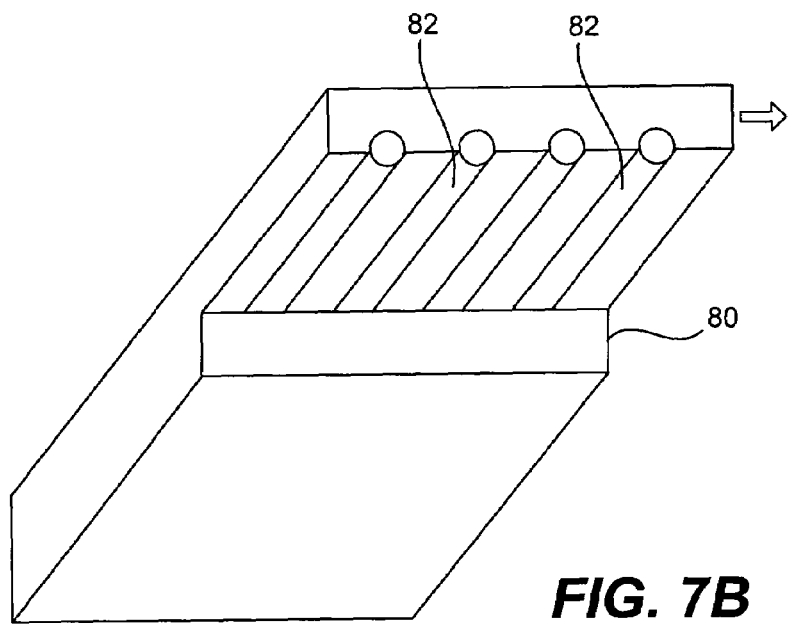
Figure 7C:
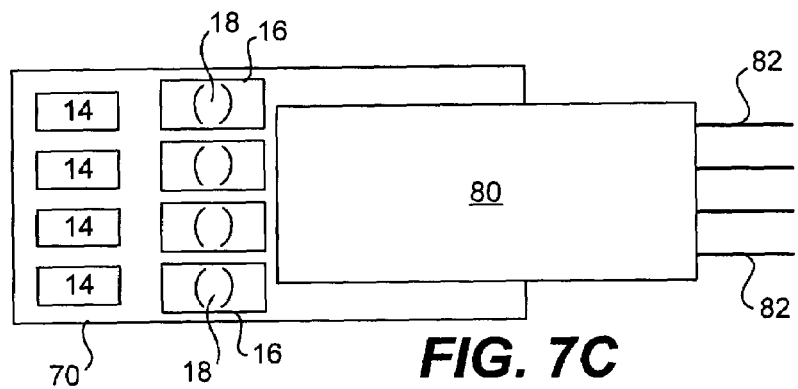

Referring to FIGS. 7A–7C, another embodiment of the present invention as shown. FIG. 7A shows a silicon bench 70 which includes a plurality of pads 12 for mounting an optical components 14 (either an emitter or photo-detector), a plurality of recess regions 16 for recessing a plurality of lenses or waveguides 18, and a plurality of alignment V-grooves 20, each with angled side walls 22. The recess region 16 and the V-groove 20 are etched into the silicon bench 10. FIG. 7B shows a stepped ferrule 80 with multiple recess regions 82. The ferrule 80 is intended to be used with the silicon bench 70. FIG. 7C shows the ferrule 80 mounted onto the silicon bench 70. With this embodiment, multiple optical fibers 36 can be passively aligned with the optical components 14 on the silicon bench 70 as described above.

Although illustrative embodiments and applications of this invention are shown and described herein, many variations and modifications are possible which remain within the concept, scope, and spirit of the invention, and these variations would become clear to those of ordinary skill in the art. For example, the alignment groove can be either V-shaped as described above or trench shaped. Accordingly, the present embodiments are to be considered as illustrative and not restrictive, and the invention is not to be limited to the details given herein, but may be modified within the scope and equivalents of the appended claims.

What is claimed is:

1. An apparatus, comprising:
    a bench having an optical component
    a groove formed in the beach, the groove configured to accommodate an optical fiber;
    a ferrule, including a recess region to accommodate the optic fiber when the ferrule is mounted onto the bench, the groove and the ferrule being configured to passively aligning the optical fiber and the optical component on the bench and;
    a cylindrical shaped connector sleeve defining a receptacle having a first opening located at a first end of the cylindrical shaped connector sleeve and a second opening located at an opposite second end of the cylindrical shaped connector sleeve, the first opening being configured to receive within to receptacle the silicon bench and ferrule and the second opening being configured to receive a plug-in connector within the receptacle of the cylindrical taped connector sleeve, the silicon bench, ferrule and plug-in connector all configured to be optically aligned within the cylindrical shaped connector sleeve.

2. The apparatus of claim 1, wherein the groove comprises but is not limited to one of the following types of shapes, V-groove or trench.

3. The apparatus of claim 2, wherein ferrule is stepped in shape.

4. The apparatus of claim 1, wherein the bench is made from etched silicon.

5. The apparatus of claim 1, wherein the bench further comprises a lens or waveguide optically positioned between the optical component and the optic fiber.

6. The apparatus of claim 1, wherein the optical component is a optical receiver.

7. The apparatus of claim 1, wherein the optical component is an optical transmitter.

8. The apparatus of claim 1, wherein the bench further comprises a plurality of optical components, lenses or waveguides and grooves, each of the grooves configured to accommodate one of a plurality of fiber optic cables respectively, and wherein the ferrule includes a plurality of the recess regions to accommodate the plurality of optic fibers when the ferrule is mounted onto the bench, the groove and the furrule being configured to passively aligning the plurality of optical fibers and the plurality of optical components on the bench respectively.

9. A method of assembling an optical connector, comprising:
    positioning an optical component and lens or waveguide onto a bench;
    inserting a fiber optic cable into a stepped ferrule which accommodates the bench;
    placing the ferrule in a groove on the bench, the groove and ferrule cooperating together to optically align the fiber optic cable and the optical component on the bench; and
    providing a cylindrical shaped connector sleeve around the silicon bench and ferrule, the cylindrical shaped connector sleeve including a first opening located at a first end of the cylindrical shaped connector sleeve to receive the silicon bench and ferrule and a second opening located at a second opposite end of the cylindrical shaped connector sleeve configured to receive a plug in connector that optically couples the fiber optic cable with an optical network or link, the silicon bench, ferrule and plug-in connector all optically aligned within the cylindrical shaped connector sleeve.

10. The method of claim 9 further comprising fabricating the bench including the groove by etching a silicon substrate.

11. The method of claim 9, further comprising fabricating the ferrule to include a stepped portion.

12. The method of claim 9, further comprising providing a lens between the optical component and the fiber optic cable.

13. The method of claim 9, wherein the optical component is an optical receiver.

14. The method of claim 13, wherein the optical component is an optical transmitter.

* * * * *

UNITED STATES PATENT AND TRADEMARK OFFICE
CERTIFICATE OF CORRECTION

| | |
|---|---|
| PATENT NO. | : 7,031,576 B2 |
| APPLICATION NO. | : 10/627437 |
| DATED | : April 18, 2006 |
| INVENTOR(S) | : Peter Deane |

Page 1 of 1

It is certified that error appears in the above-identified patent and that said Letters Patent is hereby corrected as shown below:

In the Claims:

In line 3 of claim 1 (column 4, line 13) change "beach" to --bench--.

In line 15 of claim 1 (column 4, line 25) change "within to" to --within the--.

In line 18 of claim 1 (column 4, line 28) change "cylinder taped" to --cylinder shaped--.

Signed and Sealed this

Fifth Day of December, 2006

JON W. DUDAS
*Director of the United States Patent and Trademark Office*